United States Patent [19]

Delcroix

[11] Patent Number: 5,281,124
[45] Date of Patent: Jan. 25, 1994

[54] ARRANGEMENT FOR PRESSURIZING A PLURALITY OF MOLDS WITH ONE OR MORE PRESSURIZED FLUIDS FOR MOLDING SYNTHETIC MATERIALS AND MAINTAINING SAID MATERIALS AT A PREDETERMINED TEMPERATURE IN THE MOLDS

[76] Inventor: Jean-Louis Delcroix, Avenue Maynard, Villa No. 12, 84600 Valreas, France

[21] Appl. No.: 833,964

[22] Filed: Feb. 11, 1992

[30] Foreign Application Priority Data

Feb. 12, 1991 [DE] Fed. Rep. of Germany ....... 4104152

[51] Int. Cl.$^5$ ............................................ B29C 45/72
[52] U.S. Cl. .................................. 425/144; 264/40.6; 264/237; 264/328.16; 264/345; 425/547; 425/548
[58] Field of Search ............... 425/143, 144, 547, 548, 425/552; 264/40.6, 328.16, 345, 347, 234, 236, 237, 348

[56] References Cited

U.S. PATENT DOCUMENTS

| | | | |
|---|---|---|---|
| 4,164,523 | 8/1979 | Hanning | 264/328.16 |
| 4,786,244 | 11/1988 | Holzschuh | 264/328.16 |
| 4,902,454 | 2/1990 | Steinbichler et al. | 264/328.16 |
| 5,055,025 | 10/1991 | Muller | 425/144 |

FOREIGN PATENT DOCUMENTS

| | | |
|---|---|---|
| 3603274 | 8/1987 | Fed. Rep. of Germany . |
| 61-16821 | 1/1986 | Japan . |
| 196310 | 8/1989 | Japan . |

Primary Examiner—Tim Heitbrink

[57] ABSTRACT

An arrangement for charging a plurality of molds for processing plastic materials with at least two sources of fluid and for temperature regulating the molds. Each mold of the arrangement is provided with a feed inlet conduit to which a three-way valve is connected. The feed inlet conduit is also connected to the two sources of fluid and each mold further includes an outlet conduit with a thermostat valve. A distribution element is connected to the feed inlet conduit and to the two sources of fluid. The three-way valve is connected to least two sources of fluid. This three-way valve has an outlet which is connected to the distribution element. A heating element is connected in each inlet conduit of each mold. A temperature regulator is mounted in each outlet of each mold for each heating element. This temperature regulator is coacts with the thermostat valve which is mounted downstream of each temperature regulator in each outlet conduit of each mold. A second three-way valve is connected, on the one hand, to the first three-way valve and, on the other hand, to the distribution element.

15 Claims, 2 Drawing Sheets

ARRANGEMENT FOR PRESSURIZING A PLURALITY OF MOLDS WITH ONE OR MORE PRESSURIZED FLUIDS FOR MOLDING SYNTHETIC MATERIALS AND MAINTAINING SAID MATERIALS AT A PREDETERMINED TEMPERATURE IN THE MOLDS

BACKGROUND OF THE INVENTION

This invention relates to an arrangement for maintaining a plurality of molds at a predetermined temperature during molding of synthetic materials in said molds which are being pressurized by a common pressure source from which different fluids can be conducted to the molds.

In such known arrangements an operational problem generally exists, namely to maintain certain molds at preselected temperatures independently from each other. This operational problem appears in particular in injection molding, extrusion and blow forming processes. In such processes the molds must generally be maintained at a predetermined temperature which, in the injection molding and blow forming processes, cause solidification as a result of cooling of the plastified materials which have been fed into the molds. In this way the the molded plastic material can be removed from the molds as quickly as possible. The temperature which must be maintained in such processes needs to be sufficiently high so that the viscosity of the plastic material is such that it does not "set" prior to completely filling the mold. During extrusion the extrusion mold must generally be heated to such a degree to permit a continuous introduction of the extrusion strand with a flawless paying out and cooling of the extruded plastic material in a cooling bath.

It is of course general knowledge in the state of the art that molding machines are quite expensive and it is therefore important that such machines operate as efficiently as possible. In order to achieve this object it is necessary that the molds can be exchanged as rapidly as possible so that relatively short down times occur during exchange of different mold parts in a blow forming or injection molding process or exchange of a different extrusion profiled part in an extrusion process.

In order to achieve this object the connections to the molds are generally constructed as rapid couplings which can be easily detached and are constructed in such a way that when detached from the molds no fluid leaks out of the couplings or the molds proper.

Since the molds of the state of the art molding machines are generally water-cooled, water may remain inside the molds for considerable periods of time which can lead to corrosion of the interior of the molds. Moreover such rapid couplings are expensive and frequently malfunction. When rapid couplings are used in such machines which do not automatically seal when detached, fluids will leak out from the molds during detachment of the couplings which can lead to contamination and corrosion of the exterior of the molds and, much more seriously disadvantageous, to corrosion of the hollow interior surfaces of the mold.

It is also considered important in order to achieve an intense utilization of the molding machine to heat the molds to the desired temperature as quickly as possible.

SUMMARY OF THE INVENTION

It is a general object of the invention to provide an arrangement for heating and maintaining the molds at a predetermined temperature and for conducting different fluids to a plurality of molds.

It is an other object of this invention to provide an arrangement of the aforedescribed type which is more simply and ruggedly constructed as comparable arrangements of the state of the art and which is capable, on the one hand, of achieving a rapid temperature adjustment of the individual molds by means of a single source of fluid, and, on the other hand, a simple substitution in the arrangement of one operating fluid by an other.

It is a further object of the invention to provide a process of the aforedescribed type which permits a rapid exchange of molds.

In view of these objects it is contemplated to provide the molds of the arrangement with feed conduits individually and provide at least one three-way valve by means of which the conduits are connected to a source of pressurized gas and a source of pressurized fluid. Each mold outlet is provided with a thermostat.

The three-way valve makes it possible to feed successively a gas or a fluid to expel the fluid from the conduits. The individual thermostats permit a fine adjustment of each device to a predetermined temperature.

A distribution element is provided for each source of pressurized gas and for each source of pressurized fluid. A three-way valve is provided in each feed conduit for each mold and this valve can also function as a shut off valve. In this way the molds can individually and separately be connected with the source of pressurized fluid or the source of pressurized gas without the respective conduits influencing each other. Such an arrangement makes it possible to exchange one or more molds after the fluid has been expelled from the corresponding conduit while other molds can continue to be pressurized with pressurized fluid and can continue to operate under unchanged operative conditions.

It is, however, also possible to provide an arrangement wherein the individual molds are provided with a three-way valve connected to the source of pressurized gas and the source of pressurized fluid only at their inlets. The outlets of the three-way valves are connected to the single inlet of a distribution element which is connected via a shut-off valve with the inlet of each mold. In such an arrangement the molds can also be individually and separately exchanged but during such exchange, the other molds which are not being exchanged, must be separated from the distribution element by closing the corresponding shut-off valves. This step is required to avoid an expulsion of the fluid also from these molds by the pressurized gas. The construction of this arrangement is simplified by providing only one distribution element and only one three-way valve at the inlet of the distribution element.

In the case where the fluid is conducted in a closed fluid circuit via a temperature regulator an additional three-way valve can be provided at each outlet of each mold or be connected with an outlet collector which is connected with the inlet side three way valve. In this way there is achieved that in a first position of the inlet side three way valve and the outlet side three way valve the fluid in the fluid circuit is conducted through the molds and the temperature regulator, while in the second position, pressurized air is conducted to the molds. The fluid which remains in the molds is released at the outlet sides thereof, for example, into a collection receptacle, whereas the temperature regulator remains filled with fluid, so that when the fluid circuit is activated fluid of instanteously controlled temperature is fed into the molds.

In order to regulate the temperatures in the individual molds even more sensitively and rapidly there can be provided a heating element in each feed conduit of each mold.

In order to achieve a rapid temperature rise after the coupling of an arrangement to the distributor, there can be provided in each outlet of an arrangement a temperature regulator for the corresponding heating element.

Preferably the temperature regulator for the heating element is arranged in front of the thermostat-valve. The temperature regulator controls the heating element, whereas the thermostat-valve controls the flow through the arrangement in dependence with the outlet temperature.

As a safety device each inlet of each arrangement can be provided with a safety temperature switch which is connected to the heating element which is, for example, triggered in case no fluid is present in the conduits or as a result of a leak the fluid has leaked out.

The heating element can preferably be heated electrically. In order to detach the various devices of the arrangement rapidly and simply rapid couplings can be provided in the inlet and outlet conduits of each arrangement.

The source of pressurized fluid can preferably be an inlet which is connected to a water or oil tank and the other source of pressurized fluid can be an inlet which is connected to a tank of pressurized air.

In order to regulate the operating temperatures of several devices and to effect a rapid exchange of devices, the following steps can, for example, be taken: a mold which is connected to a fluid circuit and which coacts with an injection molding or extrusion machine can first be decoupled by first closing the connections to the fluid circuit and then pressurize the conduits with pressurized gas, preferably pressurized air. In this way the fluid, preferably water, is expelled from the fluid circuit. The pressurized air is introduced into the fluid circuit until it is completely dry.

In order to achieve this the fluid circuit of a mold can be decoupled from the fluid source and be connected to a source of pressurized air. It is, however, also possible to close off the fluid and pressurized air from the mold by means of a three-way valve, which only needs be switched from a pressurized air supply position to a fluid feed position when one desires to supply one or the other fluid to the mold.

BRIEF DESCRIPTION OF THE DRAWING

With these and other objects in view, which will become apparent in the following detailed description of the present invention, which is shown by example only, it will be clearly understood in connection with the accompanying drawing, in which.

DETAILED DESCRIPTION OF THE INVENTION

Figure 1:
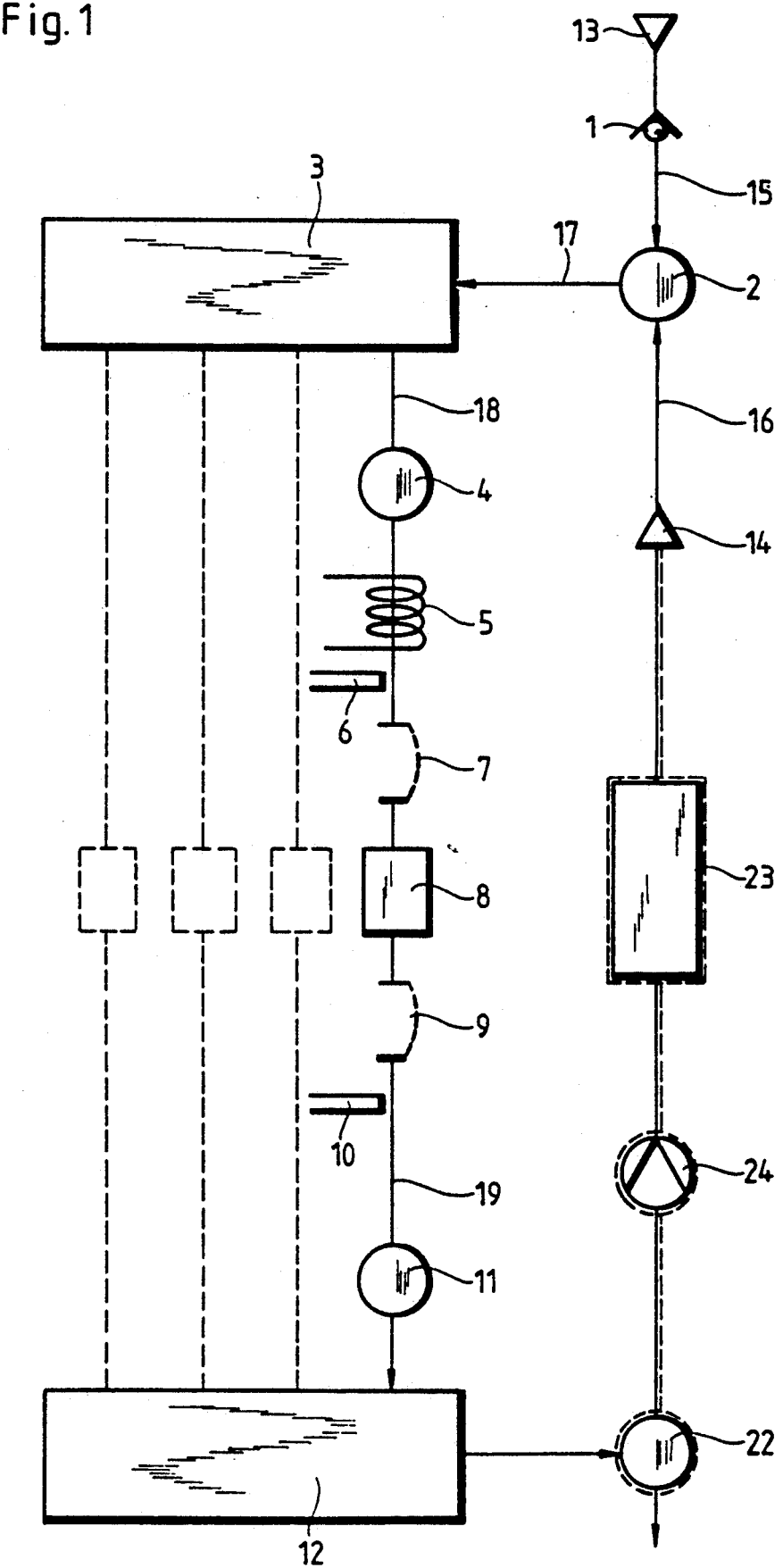
FIG. 1 is schematic flow diagram of an arrangement of this invention having a three-way valve connected in the fluid circuit in front of a distribution element.

Referring now to the drawing there is schematically illustrated in FIG. 1 a fluid circuit in which distribution element 3 is connected with the outlet of a three-way valve 2. An inlet 15 of the three-way valve is connected via check valve 1 with a source of pressurized air 13. A second inlet 16 of the three-way valve 2 is connected to a source of water 14. A plurality of conduits 18 are connected to the distribution element, each one of which is connected to a molding device, for example, an injection mold 8. For sake of clarity only one complete fluid circuit for one injection mold 8 is illustrated. There is connected in the conduit 18 first of all a shut off valve 4, which can be manually activated or can be constructed as a safety valve which shuts off automatically to prevent a leaking out of fluid when there is a break in the conduit 18. There is furthermore mounted in the conduit 18 an electrical heating element 5 which serves to heat the fluid in the conduit 18. A temperature safety switch 6 is operatively connected to the heating element 5 to interrupt the energizing of the heating element 5 when an excessive temperature increase occurs, for example as a result of leak.

The inlet conduit 18 is connected to the injection mold 8 via a rapid coupling 7. An outlet conduit 19 is also connected with the injection mold 8 via a rapid coupling 9. By decoupling the two rapid couplings 7 and 9 and a non-illustrated catch the injection mold 8 can be very rapidly exchanged for an other injection molding device. The rapid coupling devices 7 and 9 can be provided with automatic shut-off valves which prevent a leaking out of the fluid from the injection mold 8 and from the inlet conduit 18 as well as from the outlet conduit 19.

Preferably, the rapid coupling can also not be provided with such automatic shut-off valves since the operating fluid, such as water or oil, can be removed from the injection mold 8 prior to the decoupling of the rapid couplings.

A temperature regulator 10 is mounted in the outlet conduit 19 for the heating element 5 which serves to regulate the temperature of the fluid flowing through the injection mold 8. The flow-through mass which flows through the injection mold 8 can be regulated by a thermostat-valve 11 so that only so much volume of fluid flows through the injection mold 8 which is required to conduct away as much heat energy as has been transferred into the injection mold 8 during the injection molding operation. A plurality of outlet conduits 19 are connected to an outlet collector 12 from where the fluid flows into a non-illustrated collector tank when the fluid is a liquid.

During operation of the entire arrangement, that is when a plurality of injection molds 8 are operated by different injection mold machines which are being supplied by a fluid, generally cooling water, by the cooling water supply source 14 via the three-way valve 2 and the distribution element 3, the operating temperature of the individual injection molds 8 can be finely and independently adjusted.

When one or more injection molds 8 are to be exchanged, be it because downtimes and reparations are required, be it because an other plastic part is to molded, the shut-off valves 4 of the not to be exchanged molds 8 are closed. The three-way valve 2 is switched in such a way that the inlet 15 is in communication with the conduct 17 and the pressurized air from the source of pressurized air 13 flows into the distribution element 3 and from there via conduits 18 into the injection molds 8 through the shut-off valves 4 of which are not closed. In this way the cooling water is expelled from the molds 8 by pressurized air and thereafter these molds 8 are dried by means of pressurized air. Thereafter the injection molds 8 can be decoupled after the rapid couplings 7 and 9 and the usual catch are detached and can then be removed from the injection molding machine for the purpose of being repaired or stored or exchanged for other injection molds. The danger of corrosion no longer exists because the molds have been completely dried.

In lieu of a water supply source 14 the arrangement can also be connected to a source of pressurized oil. Such a source can be advantageous under certain circumstances because oil can, at atmospheric pressure, be heated to a higher temperature than 100° C. This is particularly advantageous when heating extrusion discs, which must exhibit a higher temperature during extrusion. In lieu of pressurized air an other gas, for example nitrogen can be used, when the molding process requires for special reasons a preponderately inert gas.

In the event cooling water of uniform temperature is available through the conduit 14 then this cooling water can be, after having flowed through the molds 8, conducted from the outlet collector 12 to an overflow tank. When the operating fluid is oil, or if the fluid which flows through the molds 8 is to be preheated, then the fluid circulates in a closed circuit as is shown in dashed lines in FIG. 1. This closed circuit includes the outlet collector 12 from where the fluid flows via a three-way valve 22, a recirculation pump 24 and temperature regulator 23 into the inlet conduit 16 to the three-way valve 2. In this arrangement the three-way valves 2 and 22 are interconnected so that in one position the fluid circuit is open on the inlet side as well as on the outlet side, whereas in the other position the source of pressurized air 13 is connected via the three-way valve 22 to a non-illustrated collector tank via the distributor element 3 and the outlet collector 12, so that by means of the pressurized air the fluid is first expelled from the distribution element 3 of the corresponding mold 8 of the outlet collector 12 and then is replaced by pressurized air. It is of course understood that during the aforedescribed operation the shut-off valves 4 of those molds 8 from which the fluid is not be expelled remain closed and are only opened when the three-way valves 2 and 22 are switched back and the distribution element 3, an exchanged mold 8 as well as the outlet collector 12 are again filled with fluid.

Figure 2:
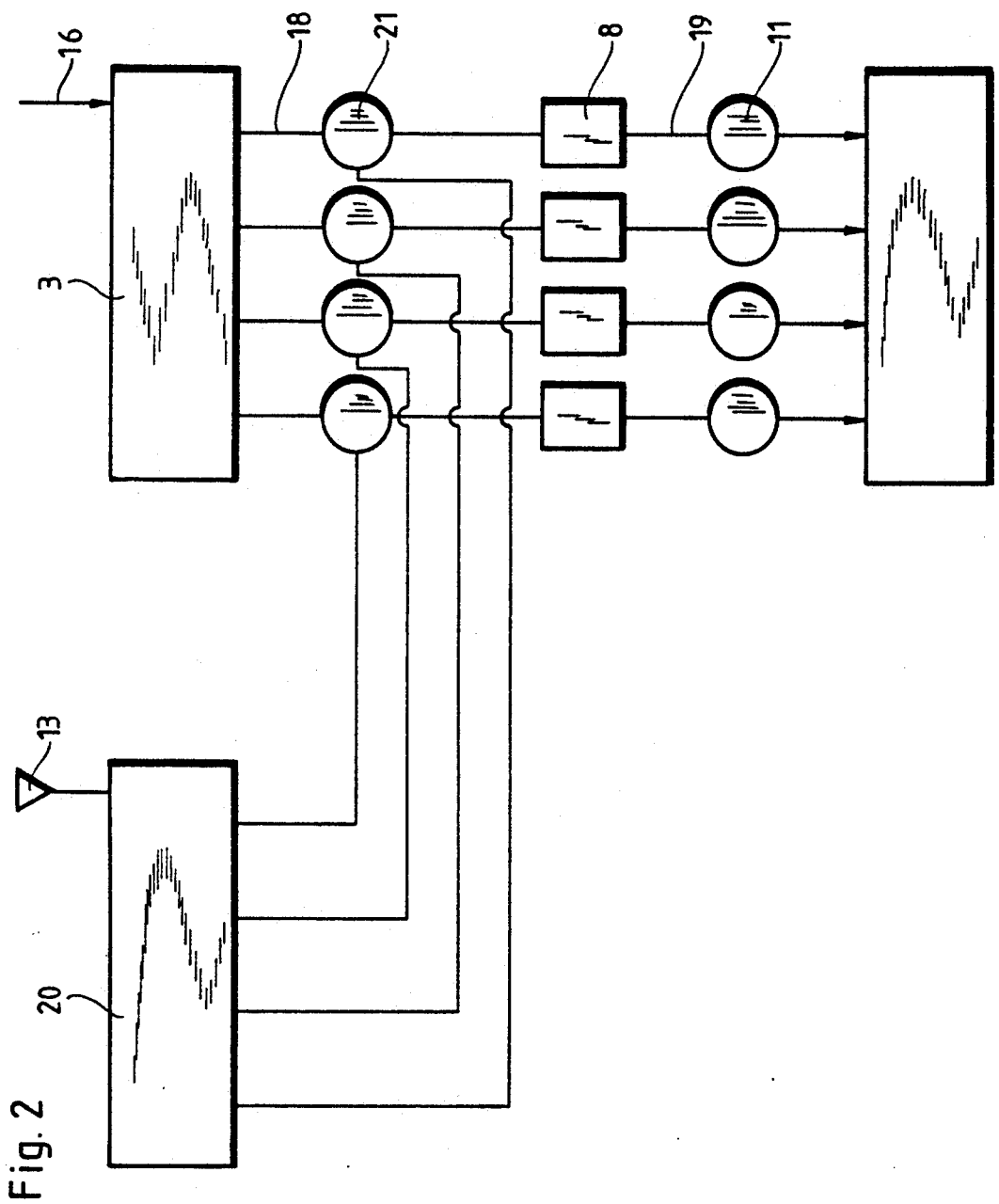
FIG. 2 is schematic flow diagram of an arrangement of this invention wherein a plurality of three-way valves are provided in the fluid circuit and each three-way valve is connected to a distribution element for the gas and fluid.

Whereas the embodiment illustrated in FIG. 1 in its simplest construction includes only one three-way valve 2 and only one distribution element 3, while, however, there are as many shut-off valves 4 as there are molds 8, the embodiment which is illustrated in FIG. 2 has one distribution element 3 for the fluid and one distribution element 20 for the gas and there are arranged three-way valves 21 in each one of the inlet conduits 18 of the molds 8. By means of these three-way valves 21 the individual molds 8 can be connected to the fluid distribution element 3 and the gas distribution element 20. In this way the individual molds 8 can be exchanged, after the fluid has been expelled therefrom, without the operation of the other molds 8, which are not being exchanged, is required to be interrupted. Simultaneously the three-way valves 21 can also serve as shut-off valves, so that in such a case the required shut-off valves 4 of the embodiment of FIG. 1 are dispensed with.

While two specific embodiments of the invention have been shown and described in detail to illustrate the application of the principles of the invention, it will be understood that the invention may be embodied otherwise without departing from such principles.

What I claim is:

1. An arrangement for temperature regulating a plurality of molds which are connected to a common source of pressurized fluid via a first three way-valve for temperature regulating via connecting lines said plurality of molds for processing plastic materials, said first three-way valve selectively receiving a fluid or gas for temperature regulating the molds and for evacuating the connecting lines to and from the molds, the arrangement comprising in combination, each mold being provided with a first feed inlet conduit connected to said first three-way valve, said first feed inlet conduit also being connected to a source of pressurized gas and a source of cooling fluid via said first three-way valve, and each mold further being provided with an outlet conduit in which a thermostat valve is operatively mounted.

2. The arrangement as set forth in claim 1, including a distribution element connected to said first feed inlet conduit and said source of pressurized gas and said source of cooling fluid.

3. The arrangement as set forth in claim 1, wherein said first three-way valve is connected to said source of pressurized gas and the source of fluid, said three-way valve having an outlet, a distribution element being mounted in said outlet, a plurality of second feed inlet conduits being connected to said distribution element and to each one of said plurality of molds, and wherein in each of said second feed inlet conduits is mounted a shut-off valve.

4. The arrangement as set forth in claim 3, wherein each mold has an outlet which is connected to a second three-way valve.

5. The arrangement as set forth in claim 2, wherein each mold is connected to said distribution element, and a second three-way valve being connected to said first three-way valve and to said distribution element.

6. The arrangement as set forth forth in claim 4, wherein a heating element is connected in each inlet conduit of each mold.

7. The arrangement as set forth in claim 5, wherein each mold is connected to said distribution element via a connecting line, and a heating element is connected in each connecting line of each mold.

8. The arrangement as set forth in claim 6, wherein a temperature regulator is mounted in each outlet of each mold for each heating element.

9. The arrangement as set forth in claim 7, wherein a temperature regulator is mounted in each outlet of each mold for each heating element.

10. The arrangement as set forth in claim 8, wherein each temperature regulator is mounted in each outlet conduit in front of said thermostat valve.

11. The arrangement as set forth in claim 9, wherein each temperature regulator is mounted in each outlet conduit in front of said thermostat valve.

12. The arrangement as set forth in claim 11, wherein in each first inlet conduit of each mold there is mounted a safety-temperature-switch which is connected to the heating element in said inlet conduit.

13. The arrangement as set forth in claim 12, wherein said heating element is electrically energized.

14. The arrangement as set forth in claim 1, wherein rapid coupling means are operatively mounted in each inlet and outlet conduit.

15. The arrangement as set forth in claim 1, wherein said source of pressurized gas is in the form of pressurized air being fed by means of a pipe to said first inlet conduit of said mold and said source of fluid being in the form of water being fed by means of a pipe to said first inlet conduit of said mold.

* * * * *